US012632251B2

(12) United States Patent
Deshpande et al.

(10) Patent No.: US 12,632,251 B2
(45) Date of Patent: May 19, 2026

(54) SOFTWARE PROJECT MANAGEMENT TOOL PLUG-IN

(71) Applicant: SAP SE, Walldorf (DE)

(72) Inventors: Ashwini Deshpande, Bangalore (IN);
Lalitendu Samantray, Bangalore (IN)

(73) Assignee: SAP SE, Walldorf (DE)

( * ) Notice: Subject to any disclaimer, the term of this patent is extended or adjusted under 35 U.S.C. 154(b) by 596 days.

(21) Appl. No.: 17/992,179

(22) Filed: Nov. 22, 2022

(65) Prior Publication Data

US 2024/0168759 A1      May 23, 2024

(51) Int. Cl.
| | |
|---|---|
| *G06F 8/77* | (2018.01) |
| *G06F 8/10* | (2018.01) |
| *G06F 8/20* | (2018.01) |

(52) U.S. Cl.
CPC .................. *G06F 8/77* (2013.01); *G06F 8/10* (2013.01); *G06F 8/20* (2013.01)

(58) Field of Classification Search
CPC ................. G06F 8/10; G06F 8/20; G06F 8/77
See application file for complete search history.

(56) References Cited

U.S. PATENT DOCUMENTS

| | | | | |
|---|---|---|---|---|
| 8,255,829 | B1 * | 8/2012 | McCormick ........... | G06Q 10/10 |
| | | | | 715/810 |
| 9,609,015 | B2 * | 3/2017 | Natarajan ............. | H04L 63/145 |
| 9,916,228 | B1 * | 3/2018 | Elgarat ............... | G06F 11/3676 |
| 10,657,023 | B1 * | 5/2020 | Willson .............. | G06F 11/3676 |
| 11,086,765 | B2 * | 8/2021 | Mukherjee .......... | G06F 11/3688 |
| 11,360,882 | B2 * | 6/2022 | Padubidri ........... | G06F 11/3698 |
| 11,429,384 | B1 | 8/2022 | Navert et al. | |
| 11,823,133 | B1 * | 11/2023 | Bammi ................. | G06Q 10/107 |
| 2008/0178154 | A1 * | 7/2008 | Basler ....................... | G06F 8/20 |
| | | | | 717/124 |
| 2010/0058114 | A1 * | 3/2010 | Perkins ................. | G06Q 10/06 |
| | | | | 714/39 |
| 2011/0213596 | A1 * | 9/2011 | Rheaume ............... | G06F 30/15 |
| | | | | 703/2 |
| 2013/0152047 | A1 * | 6/2013 | Moorthi .................. | G06F 8/71 |
| | | | | 717/124 |

(Continued)

OTHER PUBLICATIONS

"European Application Serial No. 23209376.5, Extended European Search Report mailed Apr. 24, 2024", 7 pgs.

*Primary Examiner* — Douglas M Slachta
(74) *Attorney, Agent, or Firm* — SCHWEGMAN LUNDBERG & WOESSNER, P.A.

(57) ABSTRACT

In an example embodiment, an intelligent plug-in is provided for a software project management tool that facilitates automated capture and review of key performance indices (KPIs) in order to meet the quality needs of each workstream. This added automation, however, can be technically challenging due to a variety of factors, including the number of disparate systems from which KPIs need to be captured and the desirability of adding customized KPIs. The intelligent plug-in accesses a library of KPIs, but also enables a quality lead to define new KPIs and/or customize quality KPIs from the library. The quality lead is also then able to set thresholds for each KPI from within the plug-in. Upon movement of a user story within the software project management tool to a "development completed" or similar state, an automatic review of all defined KPIs for the corresponding user story are reviewed.

17 Claims, 13 Drawing Sheets

(56)　　　　　References Cited

U.S. PATENT DOCUMENTS

| | | | |
|---|---|---|---|
| 2014/0068325 A1* | 3/2014 | Masser | G06F 11/3692 |
| | | | 714/38.11 |
| 2016/0275002 A1* | 9/2016 | Radcliff | G06F 8/73 |
| 2017/0147482 A1* | 5/2017 | Li | G06F 11/3608 |
| 2017/0357927 A1* | 12/2017 | Antonio | G06F 8/30 |
| 2018/0239603 A1* | 8/2018 | Balestrazzi | G06Q 10/06 |
| 2019/0294428 A1* | 9/2019 | Scheiner | H04L 67/34 |
| 2020/0257612 A1* | 8/2020 | Lang | G06F 11/3612 |
| 2024/0037243 A1* | 2/2024 | Sylvester | G06F 21/577 |
| 2024/0338309 A1* | 10/2024 | Wilson | G06F 8/65 |

* cited by examiner

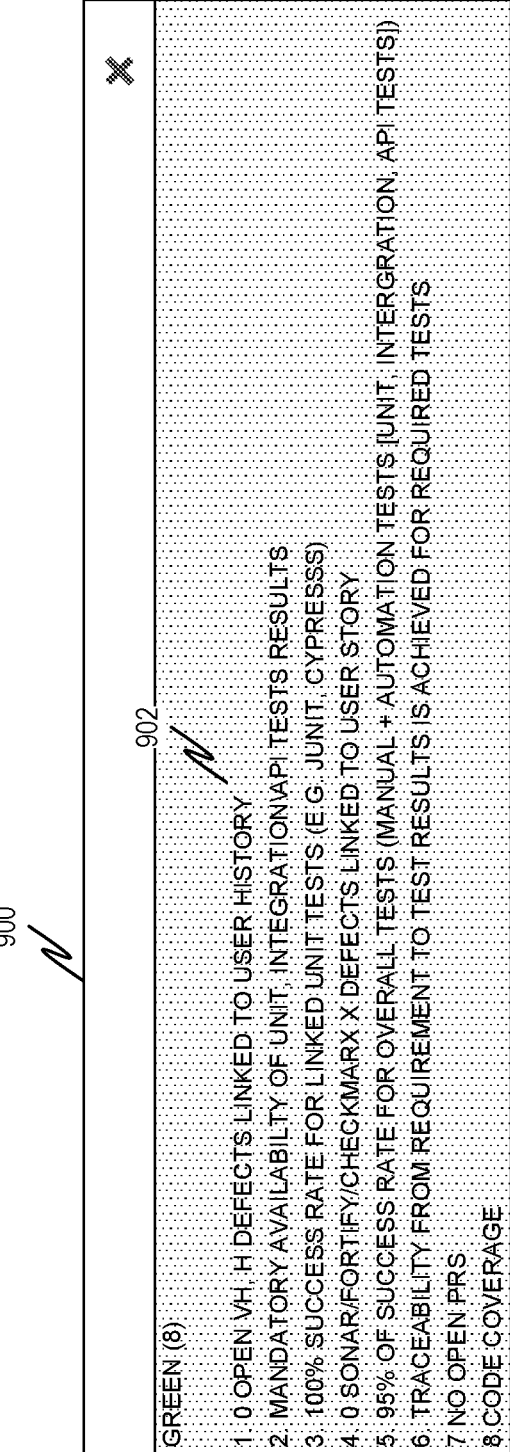

900

902

GREEN (8)
1: 0 OPEN VH, H DEFECTS LINKED TO USER HISTORY
2: MANDATORY AVAILABILTY OF UNIT, INTEGRATION,API TESTS RESULTS
3: 100% SUCCESS RATE FOR LINKED UNIT TESTS (E.G. JUNIT, CYPRESSS)
4: 0 SONAR/FORTIFY/CHECKMARX X DEFECTS LINKED TO USER STORY
5: 95% OF SUCCESS RATE FOR OVERALL TESTS (MANUAL + AUTOMATION TESTS [UNIT, INTERGRATION, API TESTS)
6: TRACEABILITY FROM REQUIREMENT TO TEST RESULTS IS ACHIEVED FOR REQUIRED TESTS
7: NO OPEN PRS
8: CODE COVERAGE

*FIG. 9*

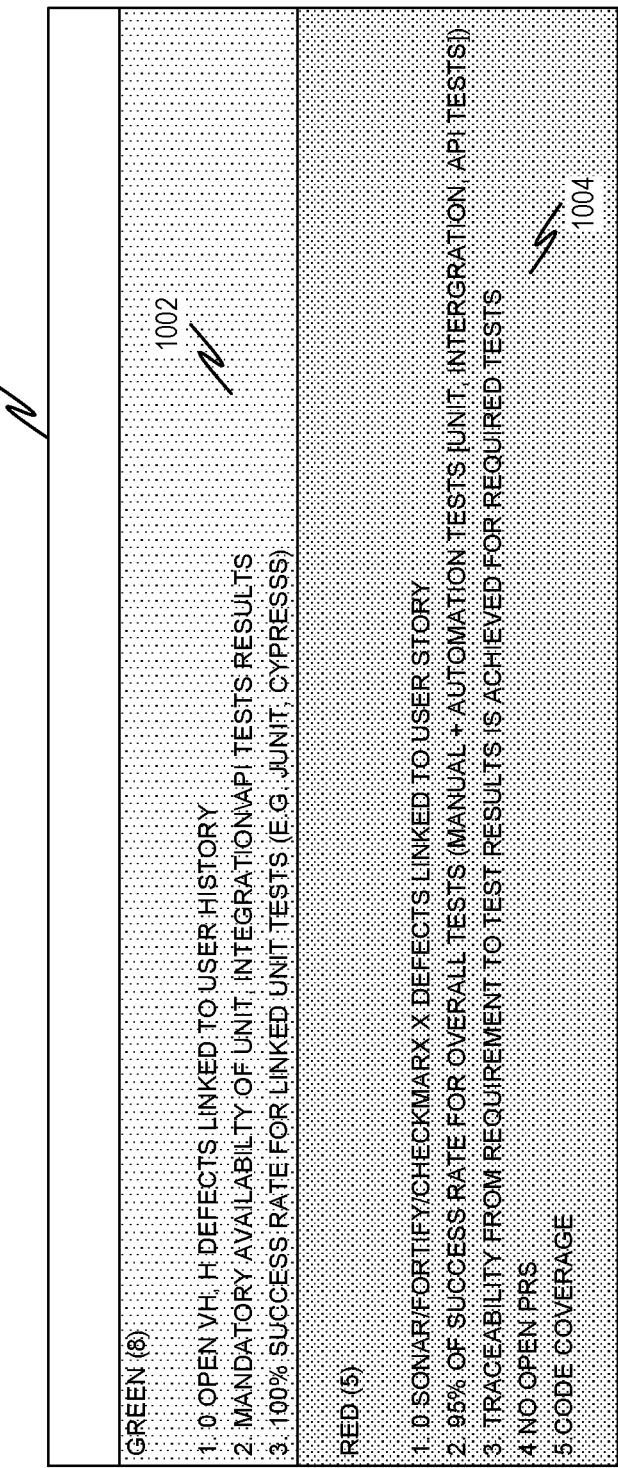

GREEN (8)

1. 0: OPEN VH, H DEFECTS LINKED TO USER HISTORY
2. MANDATORY AVAILABILITY OF UNIT, INTEGRATION, API TESTS RESULTS
3. 100% SUCCESS RATE FOR LINKED UNIT TESTS (E.G. JUNIT, CYPRESSS)

RED (5)

1. 0: SONAR/FORTIFY/CHECKMARX X DEFECTS LINKED TO USER STORY
2. 95% OF SUCCESS RATE FOR OVERALL TESTS (MANUAL + AUTOMATION TESTS [UNIT, INTERGRATION, API TESTS])
3. TRACEABILITY FROM REQUIREMENT TO TEST RESULTS IS ACHIEVED FOR REQUIRED TESTS
4. NO OPEN PRS
5. CODE COVERAGE

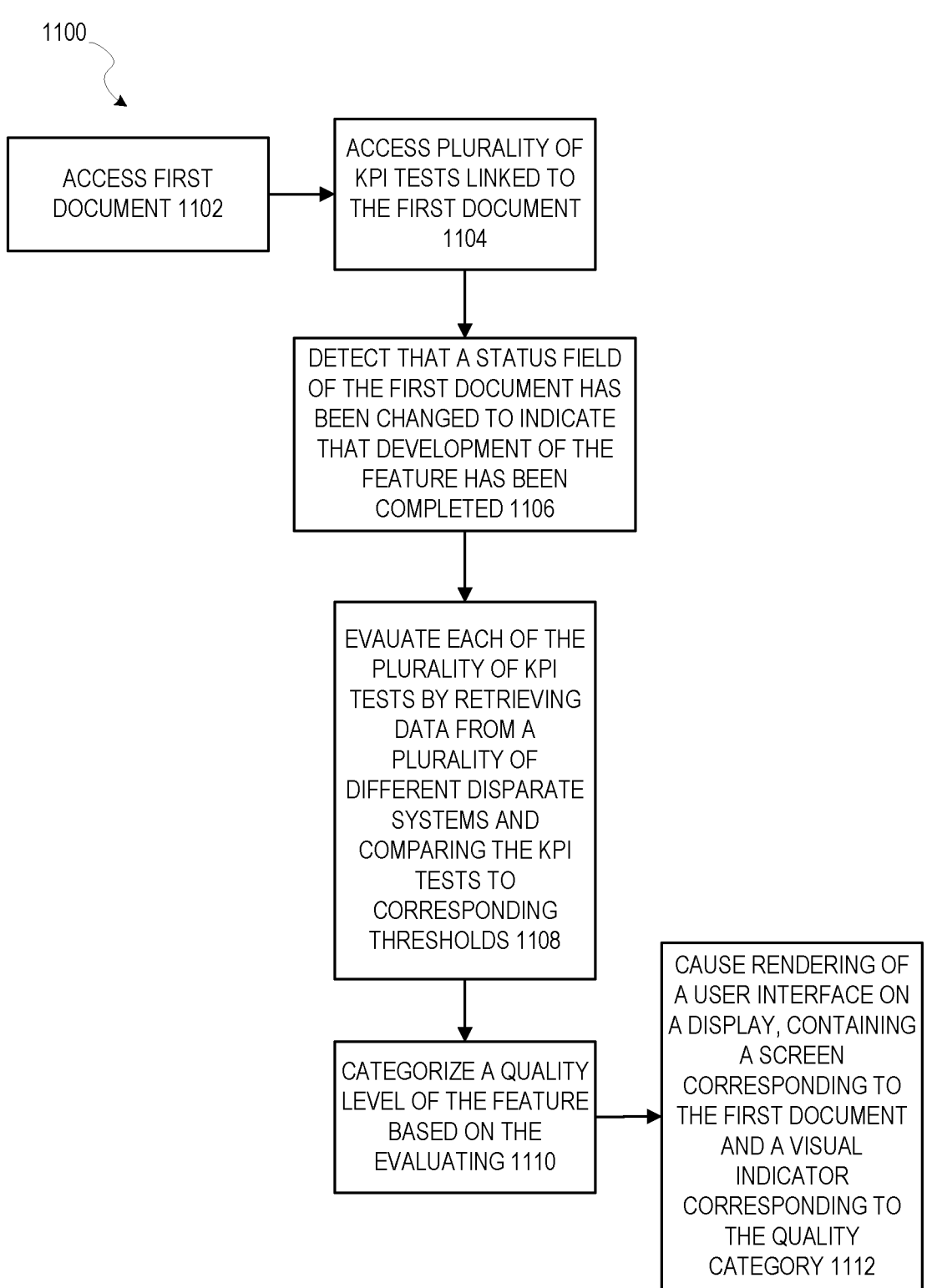

1100

ACCESS FIRST DOCUMENT 1102

ACCESS PLURALITY OF KPI TESTS LINKED TO THE FIRST DOCUMENT 1104

DETECT THAT A STATUS FIELD OF THE FIRST DOCUMENT HAS BEEN CHANGED TO INDICATE THAT DEVELOPMENT OF THE FEATURE HAS BEEN COMPLETED 1106

EVAUATE EACH OF THE PLURALITY OF KPI TESTS BY RETRIEVING DATA FROM A PLURALITY OF DIFFERENT DISPARATE SYSTEMS AND COMPARING THE KPI TESTS TO CORRESPONDING THRESHOLDS 1108

CATEGORIZE A QUALITY LEVEL OF THE FEATURE BASED ON THE EVALUATING 1110

CAUSE RENDERING OF A USER INTERFACE ON A DISPLAY, CONTAINING A SCREEN CORRESPONDING TO THE FIRST DOCUMENT AND A VISUAL INDICATOR CORRESPONDING TO THE QUALITY CATEGORY 1112

SOFTWARE PROJECT MANAGEMENT TOOL PLUG-IN

BACKGROUND

Software project management systems provide tools to allow developers and other individuals to manage the lifecycle of the development of a software application or software features of an existing application. An example of such a software project management tool is JIRA™ from Atlassian of San Francisco, CA. Software project management systems provide tools for tracking bugs in the applications/features and also for tracking requirements for the applications/features.

BRIEF DESCRIPTION OF DRAWINGS

The present disclosure is illustrated by way of example and not limitation in the figures of the accompanying drawings, in which like references indicate similar elements.

FIG. 9 is a screen capture illustrating a user interface depicting a summary screen of how a green category was assigned to a Key Performance Index (KPI) review of a user story, in accordance with an example embodiment.

FIG. 10 is a screen capture illustrating a user interface depicting a summary screen of how a red category was assigned to a KPI review of a user story, in accordance with an example embodiment.

FIG. 11 is a flow diagram illustrating a method for managing a software project, in accordance with an example embodiment.

DETAILED DESCRIPTION

Figure 1:
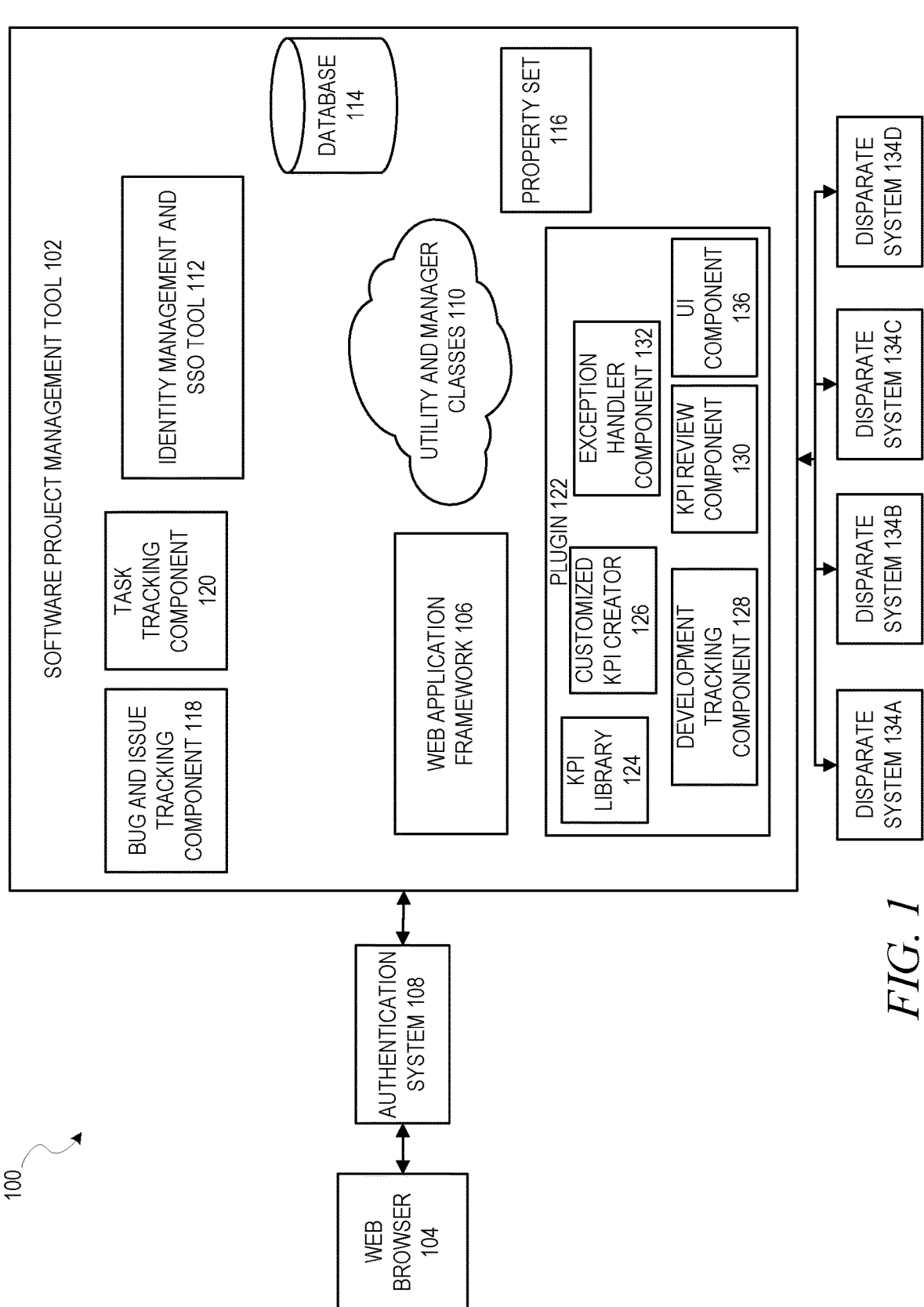
FIG. 1 is a block diagram illustrating a system for managing a software project, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Software project management tools allow for the definition of concise representations of a feature in a developing system, described by an individual who needs this new functionality. These concise representations are known as "user stories." These user stories often use non-technical language to provide context for the development team and their efforts. After reading a user story, the development team knows why they are building the feature, what aspects the feature should have, and what value it creates for the user.

Typically the development team includes a quality lead, who validates new features prior to them going live or otherwise being made available for use by users. This quality lead is often tasked with determining relevant KPIs for a user story, capturing KPIs across disparate systems, tracking KPIs in a central location on a periodic basis, reviewing all KPIs, and ensuring adherence of the KPIs to defined threshold values.

In a cloud environment, feature delivery is often performed in a very short development cycle. The existing process is inefficient due to several communication touch-points, resulting in the majority of the quality lead's time being spent on manual interventions, which impacts time-to-market.

In an example embodiment, an intelligent plug-in is provided for a software project management tool that facilitates automated capture and review of KPIs in order to meet the quality needs of each workstream. This added automation, however, can be technically challenging due to a variety of factors, including the number of disparate systems from which KPIs need to be captured and the desirability of adding customized KPIs.

The intelligent plug-in accesses a library of KPIs, but also enables a quality lead to define new KPIs and/or customize quality KPIs from the library. The quality lead is also then able to set thresholds for each KPI from within the plug-in. Upon movement of a user story within the software project management tool to a "development completed" or similar state, an automatic review of all defined KPIs for the corresponding user story are reviewed.

In an example embodiment, a specialized user interface is provided that graphically displays a quality signal for the feature in question based on different levels of confidence that the feature is functioning as desired. More particularly, the different levels of confidence may include a "green" level, indicating that all the relevant KPI thresholds had been met, a "yellow" category, indicating that some threshold percentage of all the relevant KPI thresholds had been met (e.g., 80% of all KPI tests had passed), and a "red" level, indicating that fewer than the threshold percentage of all the relevant KPI thresholds had been met. The corresponding user story is permitted to be moved to the next state in the case of a "green" level and is prevented from being moved to the next state in the case of a "red" level. With the "yellow" level, this level may essentially be considered to be a conditional signoff and permits the quality lead to move the signal state to green upon a manual review.

Bug tracking within a software project management tool can actually be referred to more broadly as issue tracking. An instance of an issue can include, for example, a bug, task, or backlog item within a feature of a project. A project can be stored, managed, or both stored and managed by a single backend system, or alternatively the project may be spread across multiple backend systems.

An issue has a lifecycle that is defined by a status. This status may include, for example, open, in-progress, completed, or closed. The lifecycle can be different for specific types of issues or projects. A priority can also be assigned to an issue. The priority indicates how important the issue is, such as critical, blocker, or minor.

Examples of KPIs that can be used to evaluate features for issues will now be described. One such example is the number of open very high or high defects linked to the user story. Another may be the availability of mandatory unit and/or integration test results. Unit tests are often written by a developer to test portions of a software code. Integration tests may be written by a developer or by others and test integrations of the software code with other software code. Both such tests are often critical to determining validity of the code of a feature, and thus if such tests are not available, then that would be an important factor in deciding whether to validate the code.

Another example is success rate for linked unit tests. Another example is the number of security defects linked to a user story. Another example is the success rate for all available tests.

Another example is whether there are any open pull requests (e.g., requests for actions by a software developer that have not yet been completed). Another example is code coverage (e.g., the percentage of lines of code of the feature that are examined by a unit or integration test).

Each of these KPIs include at least one measurement/calculation, which may also be called an argument and a variable. Each of the arguments may also have a corresponding threshold. The argument is evaluated based on a value for each variable and compared with a threshold. If the output of the argument value of the measurement transgresses the threshold, then the KPI is said to have passed. If not, then the KPI has failed. Thus, for example, in the instance where the KPI is the code coverage test, there is a calculation of what percentage of code lines are covered by a unit or integration test, and then there is a threshold value (e.g., 80%) that this percentage is compared to. In this case, if 80% or more of the code lines are covered by a unit or integration test, then the KPI passes. Otherwise, it fails.

In an example embodiment, the software project management tool is a web application, and thus users interact with the software project management tool using a web browser. However, this is not mandatory, and embodiments are foreseen where the users interact with the software project management tool via some other means, such as a dedicated software client application, running on a desktop, laptop, or mobile device.

FIG. 1 is a block diagram illustrating a system 100 for managing a software project, in accordance with an example embodiment. A software project management tool 102 operates on one or more servers (not pictured), and a user, such as a software developer, interacts with the software project management tool 102 using a web browser 104.

The software project management tool 102 includes a web application framework 106, which defines what happens when a user visits a particular Uniform Resource Locator (URL) in the web browser 104. Each request from the web browser 104 may be handled by a web application framework action, which can utilize other objects, such as utility and manager classes 110, to accomplish a task.

Authentication of communications between the web browser 104 and the software project management tool 102 may be performed by authentication system 108. The authentication system 108 may be implemented as a servlet filter. A servlet filter is a pluggable object oriented programming component that can be used to intercept and process requests before they are sent to servlets and respond after servlet code is finished. The job of the authentication system 108 is, given a web request, to associate the request with a particular user. It supports several methods of authentication, including Hypertext Transfer Protocol (HTTP) basic authentication, form-based authentication (i.e., redirect to an internal or external login form), and looking up credentials already stored in the user's session (e.g., cookies set by a single sign-on (SSO) system.

The authentication system 108 acts to check the credentials of incoming requests and delegates any user-management functions (e.g., looking up a user, checking a user's password is correct) to the software project management tool 102.

On the software project management tool 102, an identity management and SSO tool 112 stores users and groups in database 114 (which may, in some example embodiments, be a relational database). It also stores group membership in database 114. The identity management and SSO tool 112 also authenticates users (e.g., checks to see if user passwords match) and provides an application program interface (API) that allows the management (e.g., creation, deletion) of users, groups, and group memberships. The identity management and SSO tool 112 also allows the software project management tool 102 to connect to external systems to retrieve user/group data and keeps a copy of any external data in the database 114 for faster retrieval, potentially synchronizing in the background.

Property set 116 is a framework that can store a set of properties (key/value pairs) against a particular "entity" with a unique identification. For example, property set 116 may be used to store a user's preferences, in which case the "entity" is a user. Each property has a key and a value and is associated with a single entity.

The utility and manager classes 110 contain potentially hundreds of different classes, from utility classes to manager objects. Manager objects typically have one specific goal or topic. Manager objects often use a lot of external dependencies. Manager objects also may be wrapped by a corresponding service class. The idea is that any validation of logic necessary is carried out by the service classes, whereas the manager classes are responsible for actually performing the action.

Included in software project management tool 102 is a bug and issue tracking component 118 and a task tracking component 120. The bug and issue tracking component 118 acts to track bugs and other issues that occur in a software project. It helps software teams find, record, and track the bugs and issues. Task tracking component 120 tracks tasks (which may or may not include bugs and other issues tracked by the bug and issue tracking component 118) that need to performed for software project completion.

In an example embodiment, a plugin 122 is provided in the software project management tool 102. The plugin 122 adds additional functionality not present in the version of the software project management tool 102 that lacks the plugin 122. Specifically, the plugin provides smart functionality that facilitates the automated capture and review of KPIs, including customized KPIs, to meet the quality needs of each workstream.

Included in the plugin 122 is a KPI library 124. The KPI library 124 includes commonly used KPIs. A customized KPI creator 126 additionally allows users to define custom KPIs or to modify KPIs in the KPI library to make them custom. A development tracking component 128 tracks the development status of the software project, such as by interacting with the bug and issue tracking component 118 and task tracking component 120. When the development tracking component 128 detects movement of a user story to the "development completed" or a similar state, it notifies a KPI review component 130. The KPI review component 130 performs an automatic review of all defined KPIs for the user story, whether from the KPI library 124 originally or generated/modified by the customized KPI creator 126. The KPI review component 130 classifies the results of this automatic review into one of three categories: green, yellow, or red, as described in more detail above.

An exception handler component 132 provides a mechanism to handle exception scenarios through special rights. Specifically, certain users, such as the engineering lead or quality lead can make a final decision to move the KPI review state from yellow to green (or even from red to yellow).

Referring back to the KPI review component 130, this component may further communicate with disparate systems 134A-134D to calculate the specific KPI values that will be measured against thresholds defined in the KPI library 124 and/or customized KPI creator 126. Here, for example, disparate system 134A includes a system storing the user story, in which artifacts due to the defects can be detected. Disparate system 134B includes a test repository tool. The test repository tool stores test results. Examples of test repository tools include GTP™ from SAP SE of Walldorf, Germany, X-ray™ from Idera, Inc. of Houston, Texas, and Quick Test Professional (QTP)™ from Hewlett-Packard, Inc. of Palo Alto, CA.

Disparate system 134C includes a source code quality management tool, such as Sonar™, from SonarSource S.A. of Geneva, Switzerland, which stores results of bugs, especially security bugs, as well as code coverage-related data. Disparate system 134D includes a code change tracking tool such as GitHub™ from Github, Inc. of San Francisco, California, where changes to code are recorded and tracked. This is where items such as open pull requests may be found.

How the plugin 122 communicates with the disparate systems 134A-134C to determine the results needed to evaluated the KPIs associated with a particular user story may vary depending upon the type of the disparate system 134A-134D and the type of the results.

The priority (e.g., very high, high, medium, low) of the defects linked to the user story can be queried using a query in the form: How→issue in linkedIssues ("UserstoryXXX, "relates to") AND issuetype=Bug AND priority in ("Very High", "High").

The mandatory availability of Unit and Integration test results may be performed by accessing, for example, a test repository tool. The same tool can be used to evaluate the success rate for linked unit tests.

For security defects linked to the user story, the folder structure of open issues from the source code quality management tool may be checked to determine if any open issues are specific to a new requirement of the user story.

The overall success rate for tests in general can be computed by the plugin 122 itself, using the results pulled from the disparate systems 134A-134D.

A user interface component 136 then is able to generate a visual indicator of the categorical quality level of the results of the KPI tests. This visual indicator may include, for example, a color indicative of the category (e.g., green, yellow, or red) and a button that, when selected by a user, launches a screen where a user can see which KPI tests were successful and which failed.

Figure 2:
FIG. 2 is a screen capture illustrating a user interface, in accordance with an example embodiment.

FIG. 2 is a screen capture illustrating a user interface 200, in accordance with an example embodiment. Here, the user interface 200 provides a project settings screen, where the user can select a button 202 for creating a custom field at a project level. Upon selection of the button 202, a user interface for defining a quality KPI for a user story is displayed.

Figure 3:
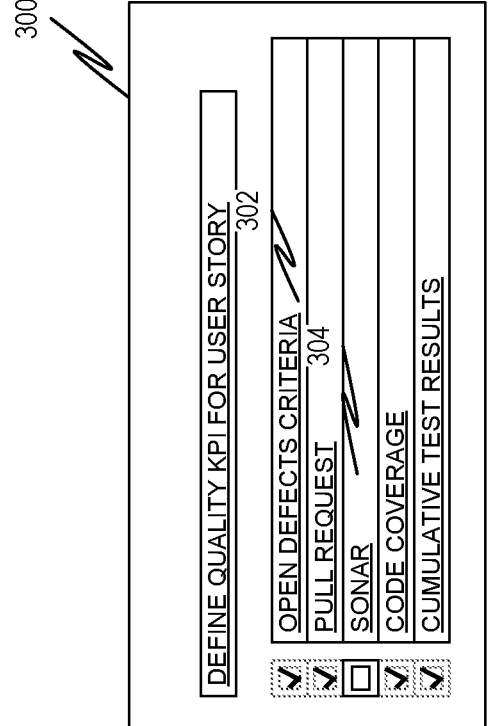
FIG. 3 is a screen capture illustrating a user interface, in accordance with another example embodiment.

FIG. 3 is a screen capture illustrating a user interface 300, in accordance with an example embodiment. Here, the user interface 300 allows the user to define a quality KPI for a user story. For example, a user may select to edit parameters for open defects criteria 302 or Sonar 304. Sonar 304 is a security tool.

Figure 4:
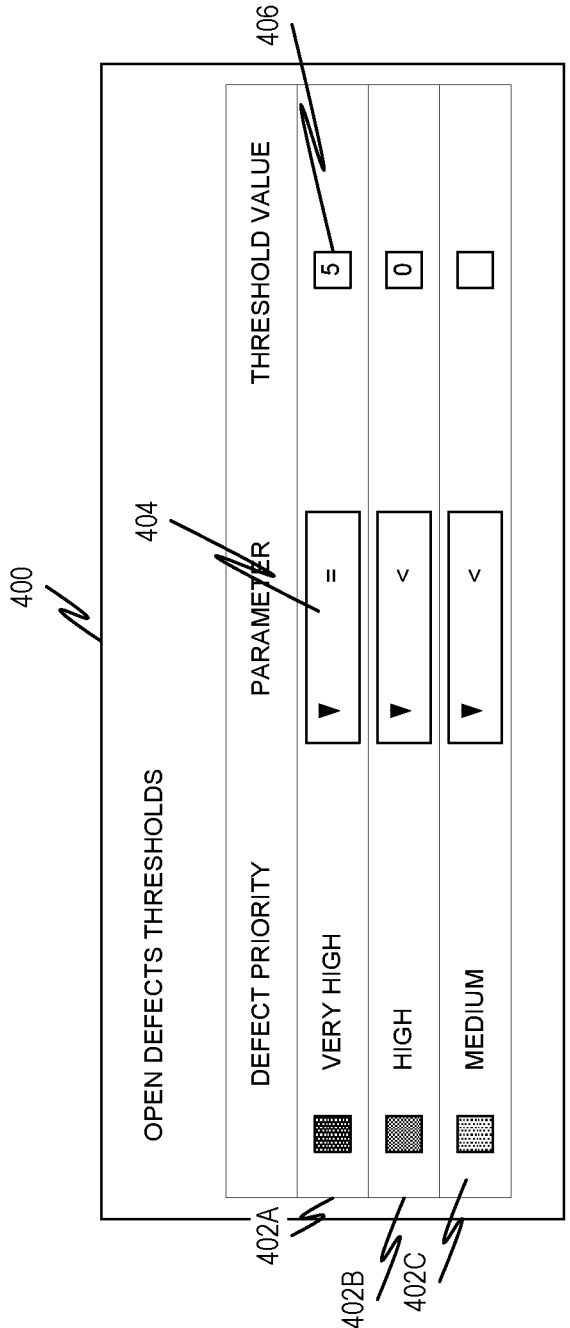
FIG. 4 is a screen capture illustrating a user interface, in accordance with another example embodiment.

FIG. 4 is a screen capture illustrating a user interface 400, in accordance with an example embodiment. Here, the user has selected to edit parameters for open defects criteria 302. The user is able to edit parameters for different categories of defect priority 402A, 402B, 402C. Here, for example, the user can edit the operator 404 and threshold value 406 for the "very high" defect priority 402A.

Figure 5:
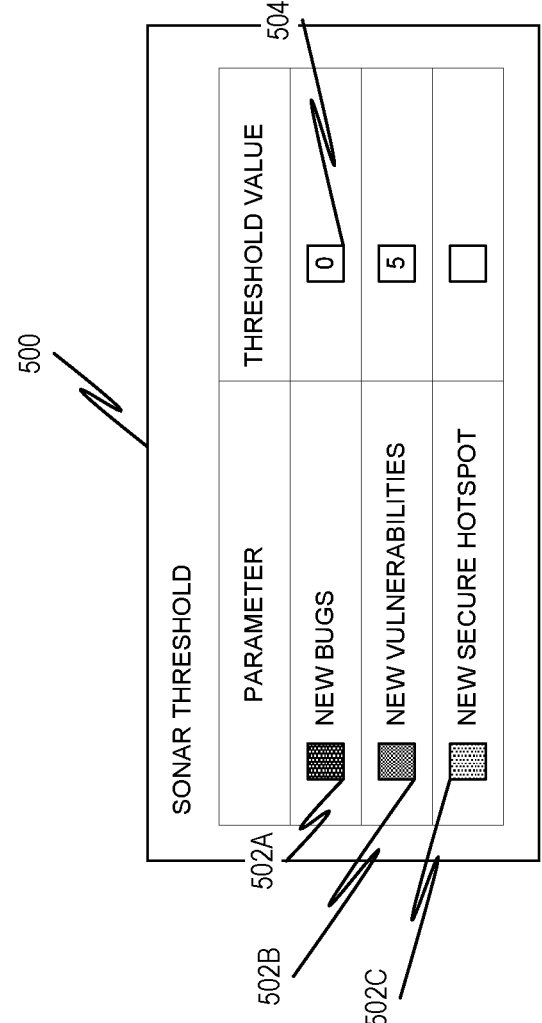
FIG. 5 is a screen capture illustrating a user interface, in accordance with an example embodiment.

FIG. 5 is a screen capture illustrating a user interface 500, in accordance with an example embodiment. Here, the user has selected to edit parameters for Sonar 304. The user is able to edit parameters for different prepopulated parameters 502A, 502B, 502C. Here, for example, the user can edit the threshold value 504 for the "new bugs" prepopulated parameter 502A.

Figure 6:
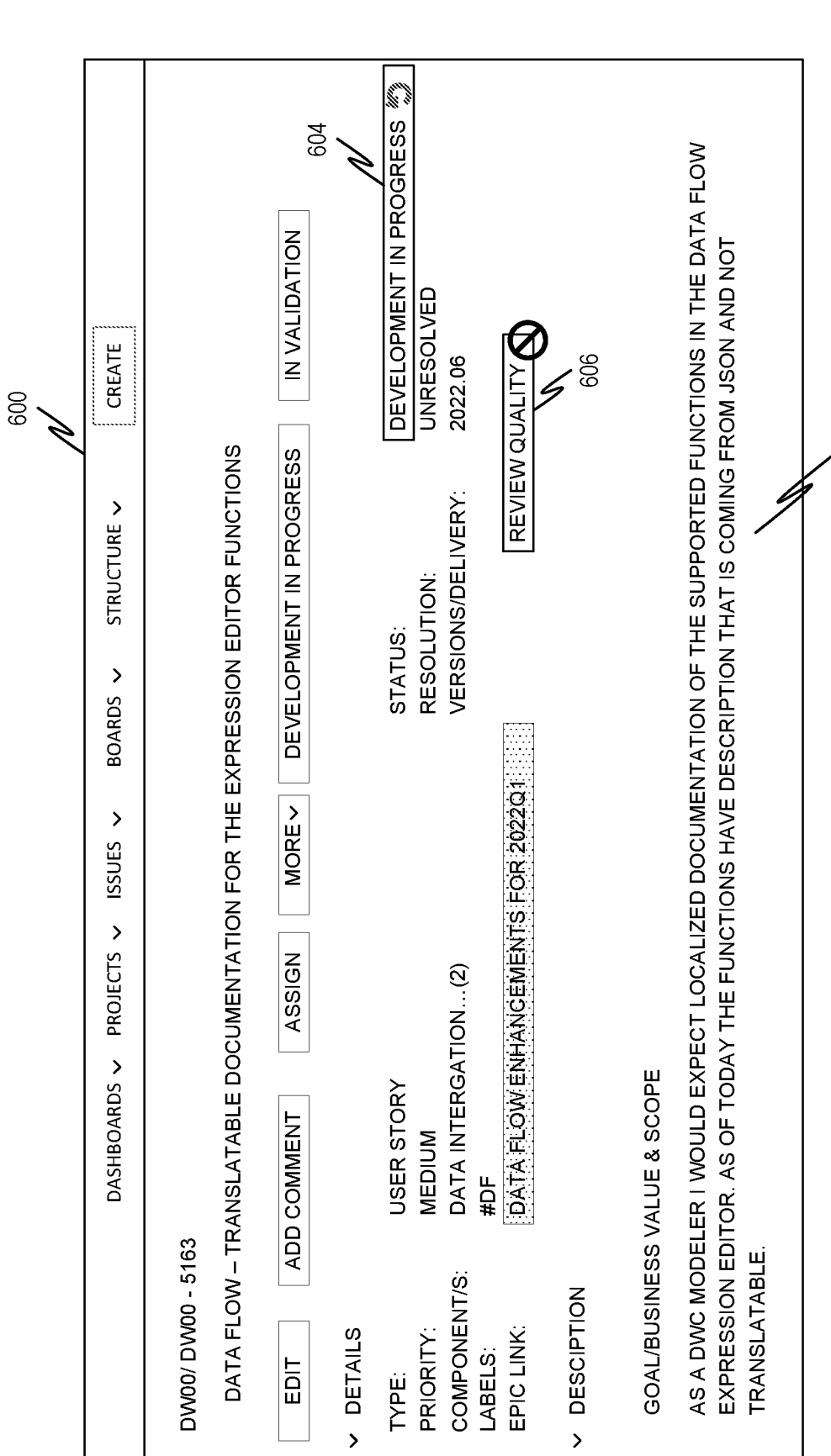
FIG. 6 is a screen capture illustrating a user interface, in accordance with another example embodiment.

FIG. 6 is a screen capture illustrating a user interface 600, in accordance with an example embodiment. Here, the user interface 600 provides an indication of a user story. Here, for example, the description of the user story is provided in section 602. The current status (here "development is in progress") is depicted at field 604. A "review quality KPI" button 306 is provided, but it is grayed out (i.e., non-selectable) until the current status in field 604 changes to "development complete.".

Figure 7:
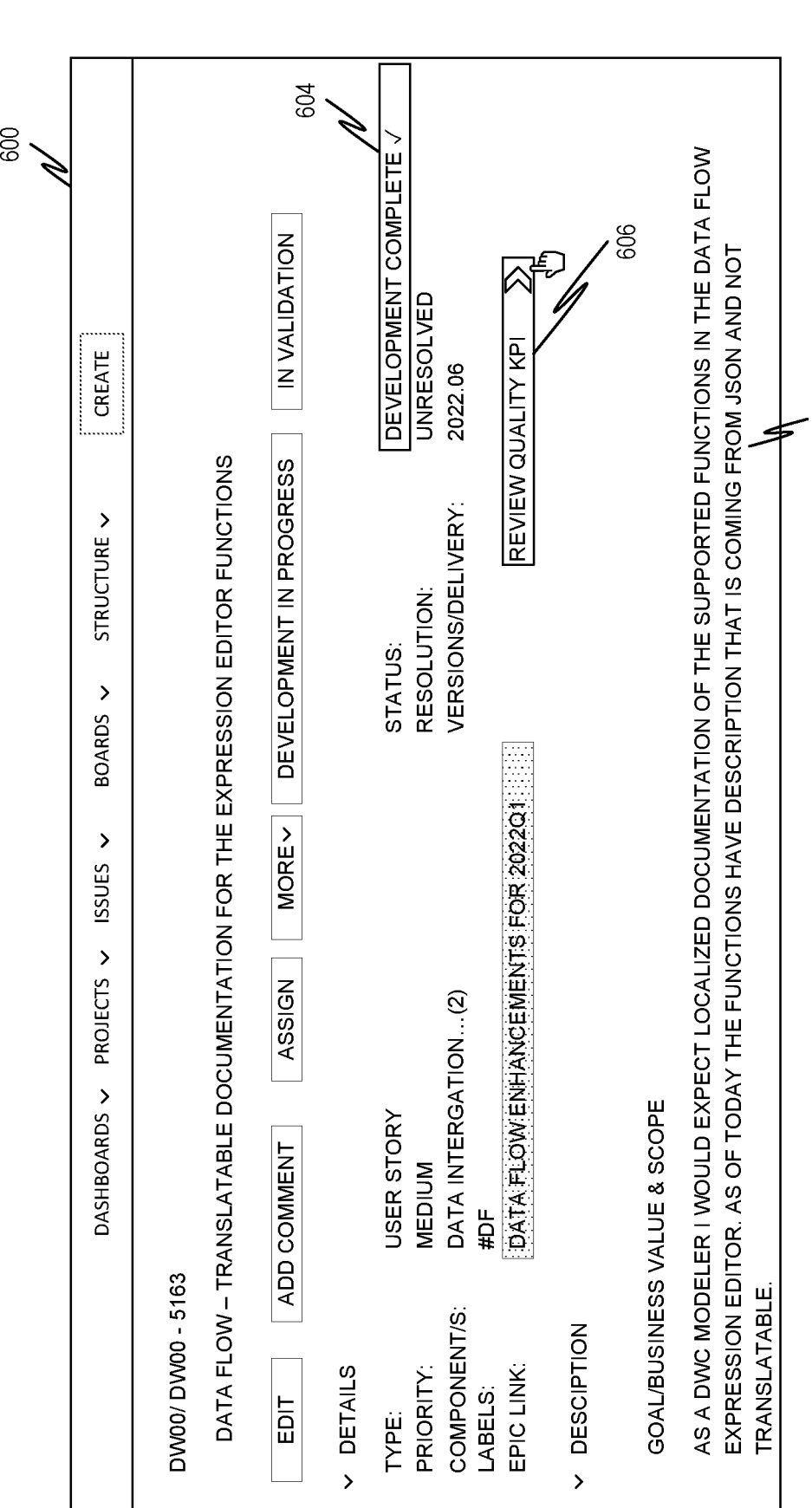
FIG. 7 is a screen capture illustrating the user interface after development is complete, in accordance with an example embodiment.

FIG. 7 is a screen capture illustrating the user interface 600 after development is complete, in accordance with an example embodiment. Here, the review quality KPI button 606 is now selectable since the status in field 604 has been changed to development complete. This allows for a straightforward way for a quality lead to review the results of the KPI tests that are associated with this user story.

Figure 8:
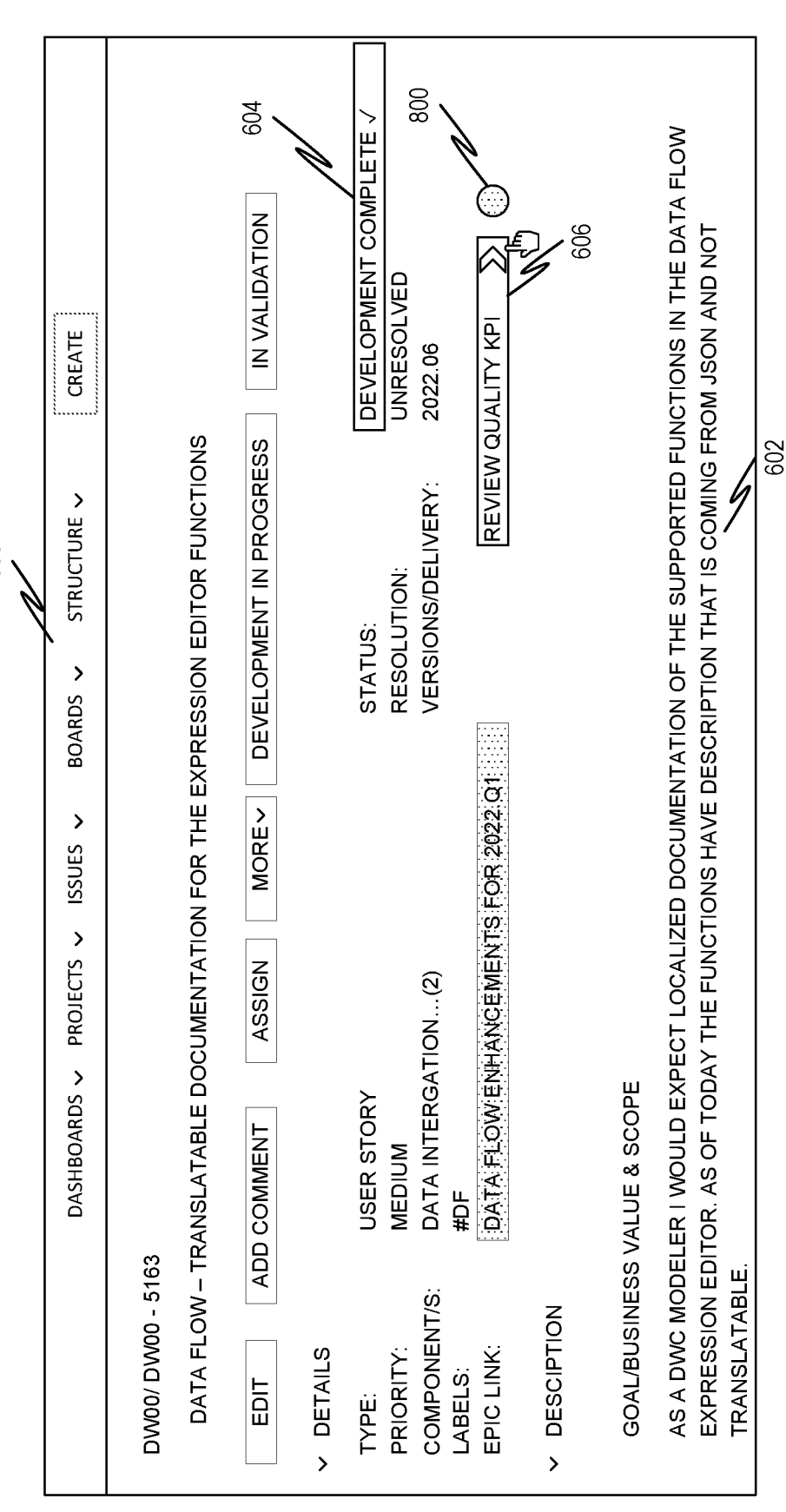
FIG. 8 is a screen capture illustrating an alternative screen of the user interface after development is complete, in accordance with an example embodiment.

FIG. 8 is a screen capture illustrating an alternative screen of the user interface 600 after development is complete, in accordance with an example embodiment. Here, a visual indicator 800 has been added next to the review quality KPI button 606. The visual indicator 800 provides a visual indicator of the category of the KPI review that was automatically performed, as described earlier. Specifically, in an example embodiment, as described earlier, the results of this review may be classified into green, yellow, or red categories. Here, the shade of visual indicator is depicted as being classified as green, meaning that the KPI review has passed (either completely or at least to the point that no user intervention is needed to override it). It should be noted that while embodiments are described herein where the categories are specifically the colors green, yellow, and red, to resemble those of a traffic light, in other example embodiments, other colors, or even other types of visual indicators entirely, may be used instead. In this case, however, since visual indicator 800 reflects a category indicating that the KPI review has passed, then selecting on review quality KPI button 606 results in a summary being presented of how that category was determined.

FIG. 9 is a screen capture illustrating a user interface 900 depicting a summary screen of how a green category was assigned to a KPI review of a user story, in accordance with an example embodiment. Here, a list of all the tests that passed is presented in green at section 902. Here, there are 8 such tests, which just so happens to be all the KPI tests associated with this particular user story. As such, here the user interface 900 is presenting only good news (i.e., that all KPIs have passed), although in certain circumstances it would be possible for the overall KPI review to pass (i.e., be in the green category), even if some individual tests failed, in which case those failed tests could also be presented in this user interface 900 under a different section.

Referring back to FIG. 8, if it turned out that the result of the KPI review was in the red category, meaning that it has failed, then visual indicator 800 would depict a different color than shown in FIG. 8, namely the red color. In such a case, the user would still be able to click on the review quality KPI button 606 to obtain a summary of how that category was determined.

FIG. 10 is a screen capture illustrating a user interface 1000 depicting a summary screen of how a red category was assigned to a KPI review of a user story, in accordance with an example embodiment. Here, the list of all tests that passed are presented in green at section 1002, while the list of all tests that failed are presented in red at section 1004.

FIG. 11 is a flow diagram illustrating a method 1100 for managing a software project in accordance with an example embodiment. At operation 1102, a first document is accessed. The first document includes a description of a capability need for a feature of a software in development. The first document may be, for example, a user story. At operation 1104, a plurality of KPI tests linked to the first document are accessed. Each KPI test includes at least one argument and at least one variable, with each argument having an associated threshold. These KPI tests may be accessed from a KPI library in a software project management tool and/or may be customized KPI tests specifically for the first document.

At operation 1106, it may be detected that a status field of the first document has been changed to indicate that development of the feature has been completed. At operation 1108, in response to the detecting, each of the plurality of KPI tests may be evaluated by retrieving data from a plurality of disparate systems and comparing the evaluated KPI tests to the corresponding thresholds. At operation 1110, based on the evaluating, a quality level of the feature may be categorized in one of a plurality of different quality categories.

At operation 1112, rendering of a user interface may be caused on a display, the user interface containing a screen corresponding to the first document and a visual indicator corresponding to the quality category in which the quality level of the feature has been categorized.

In view of the disclosure above, various examples are set forth below. It should be noted that one or more features of an example, taken in isolation or combination, should be considered within the disclosure of this application.

Example 1. A system comprising:
at least one hardware processor; and
a non-transitory computer-readable medium storing instructions that, when executed by the at least one hardware processor, cause the at least one hardware processor to perform operations comprising:
accessing a first document, the first document including a description of a capability need for a feature of a software in development;
accessing a plurality of key performance indices (KPI) tests linked to the first document, each KPI test including at least one argument and at least one variable, each argument having an associated threshold;
detecting that a status field of the first document has been changed to indicate that development of the feature has been completed;
in response to the detecting, evaluating each of the plurality of KPI tests by retrieving data from a plurality of disparate systems and comparing the evaluated KPI tests to the corresponding thresholds;
based on the evaluating, categorizing a quality level of the feature in one of a plurality of different quality categories; and
causing rendering of a user interface on a display, the user interface containing a screen corresponding to the first document and a visual indicator corresponding to the quality category in which the quality level of the feature has been categorized.

Example 2. The system of Example 1, wherein at least some of the plurality of KPI tests are accessed from a KPI library in a software project management tool.

Example 3. The system of Example 2, wherein at least some of the plurality of KPI tests have been customized specifically for the first document.

Example 4. The system of any of Examples 1-3, wherein the user interface further includes a button rendered next to the visual indicator, the button, when selected by a user, causing rendering of a separate screen indicating which of the plurality of KPI tests have passed and which of the plurality of KPI tests have failed.

Example 5. The system of any of Examples 1-4, wherein at least one of the disparate systems is a bug and issue tracking component.

Example 6. The system of any of Examples claim 1-5, wherein the operations are performed by a plugin of a software project management tool.

Example 7. The system of any of Examples 1-6, wherein at least one of the KPI tests is an indication of what percentage of source code corresponding to the feature is covered by at least one unit or integration test.

Example 8. A method comprising:
accessing a first document, the first document including a description of a capability need for a feature of a software in development;
accessing a plurality of key performance indices (KPI) tests linked to the first document, each KPI test including at least one argument and at least one variable, each argument having an associated threshold;
detecting that a status field of the first document has been changed to indicate that development of the feature has been completed;
in response to the detecting, evaluating each of the plurality of KPI tests by retrieving data from a plurality of disparate systems and comparing the evaluated KPI tests to the corresponding thresholds;
based on the evaluating, categorizing a quality level of the feature in one of a plurality of different quality categories; and
causing rendering of a user interface on a display, the user interface containing a screen corresponding to the first document and a visual indicator corresponding to the quality category in which the quality level of the feature has been categorized.

Example 9. The method of Example 8, wherein at least some of the plurality of KPI tests are accessed from a KPI library in a software project management tool.

Example 10. The method of Example 9, wherein at least some of the plurality of KPI tests have been customized specifically for the first document.

Example 11. The method of any of Examples 8-10, wherein the user interface further includes a button rendered next to the visual indicator, the button, when selected by a user, causing rendering of a separate screen indicating which of the plurality of KPI tests have passed and which of the plurality of KPI tests have failed.

Example 12. The method of any of Example 8-11, wherein at least one of the disparate systems is a bug and issue tracking component.

Example 13. The method of any of Examples 8-12, wherein the operations are performed by a plugin of a software project management tool.

Example 14. The method of any of Examples 8-13, wherein at least one of the KPI tests is an indication of what percentage of source code corresponding to the feature is covered by at least one unit or integration test.

Example 15. A non-transitory machine-readable medium storing instructions which, when executed by one or more processors, cause the one or more processors to perform operations comprising:

accessing a first document, the first document including a description of a capability need for a feature of a software in development;

accessing a plurality of key performance indices (KPI) tests linked to the first document, each KPI test including at least one argument and at least one variable, each argument having an associated threshold;

detecting that a status field of the first document has been changed to indicate that development of the feature has been completed;

in response to the detecting, evaluating each of the plurality of KPI tests by retrieving data from a plurality of disparate systems and comparing the evaluated KPI tests to the corresponding thresholds;

based on the evaluating, categorizing a quality level of the feature in one of a plurality of different quality categories; and causing rendering of a user interface on a display, the user interface containing a screen corresponding to the first document and a visual indicator corresponding to the quality category in which the quality level of the feature has been categorized.

Example 16. The non-transitory machine-readable medium of Example 15, wherein at least some of the plurality of KPI tests are accessed from a KPI library in a software project management tool.

Example 17. The non-transitory machine-readable medium of Example 16, wherein at least some of the plurality of KPI tests have been customized specifically for the first document.

Example 18. The non-transitory machine-readable medium of any of Examples 15-17, wherein the user interface further includes a button rendered next to the visual indicator, the button, when selected by a user, causing rendering of a separate screen indicating which of the plurality of KPI tests have passed and which of the plurality of KPI tests have failed.

Example 19. The non-transitory machine-readable medium of Examples 15-18, wherein at least one of the disparate systems is a bug and issue tracking component.

Example 20. The non-transitory machine-readable medium of Examples 15-19, wherein the operations are performed by a plugin of a software project management tool.

Figure 12:
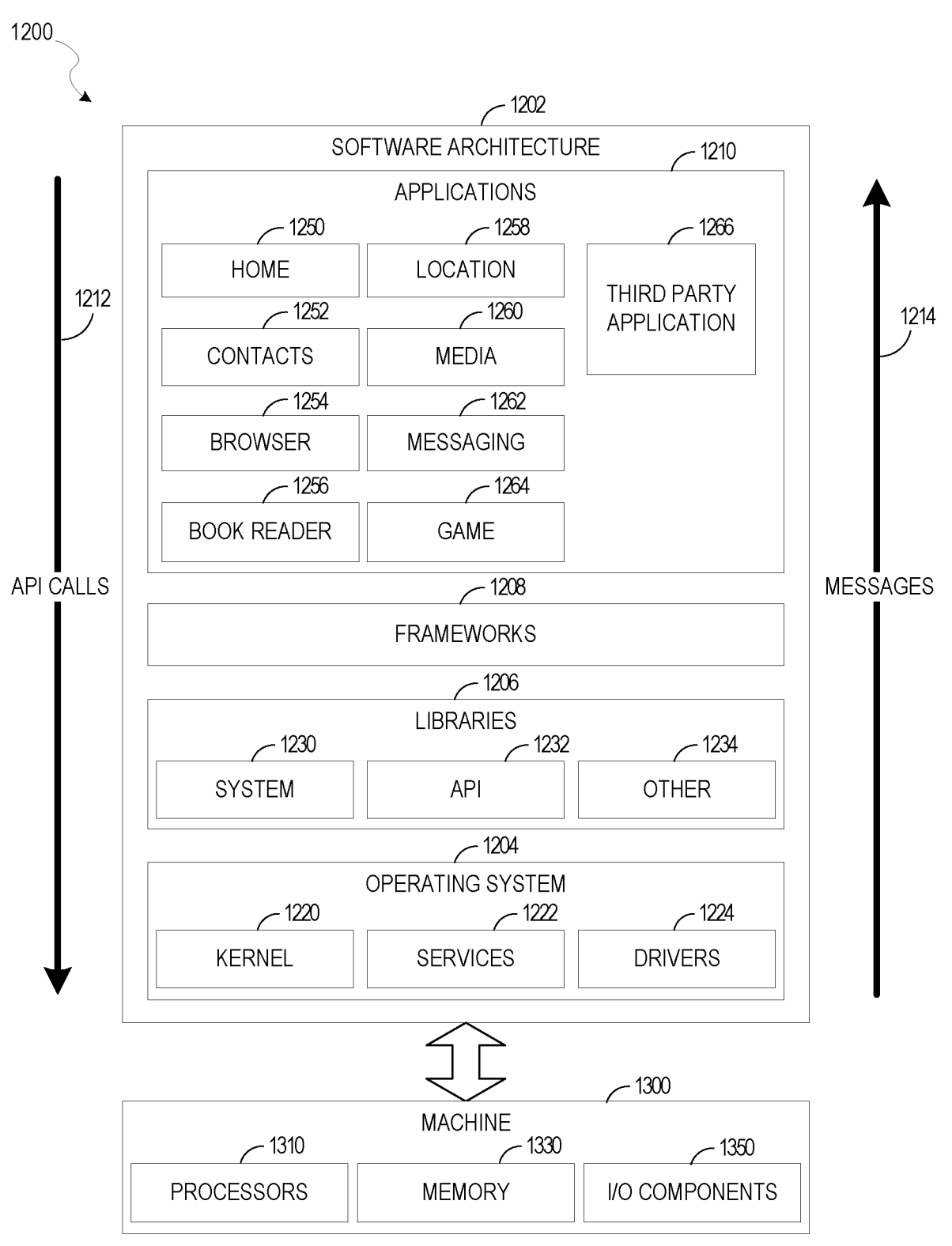
FIG. 12 is a block diagram illustrating an example architecture of software, which can be installed on any one or more of the devices described above.

FIG. 12 is a block diagram 1200 illustrating a software architecture 1202, which can be installed on any one or more of the devices described above. FIG. 12 is merely a non-limiting example of a software architecture, and it will be appreciated that many other architectures can be implemented to facilitate the functionality described herein. In various embodiments, the software architecture 1202 is implemented by hardware such as a machine 1300 of FIG. 13 that comprises processors 1310, memory 1330, and input/output (I/O) components 1350. In this example architecture, the software architecture 1202 can be conceptualized as a stack of layers where each layer may provide a particular functionality. For example, the software architecture 1202 comprises layers such as an operating system 1204, libraries 1206, frameworks 1208, and applications 1210. Operationally, the applications 1210 invoke Application Program Interface (API) calls 1212 through the software stack and receive messages 1214 in response to the API calls 1212, consistent with some embodiments.

In various implementations, the operating system 1204 manages hardware resources and provides common services. The operating system 1204 comprises, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware. For instance, the drivers 1224 can comprise display drivers, camera drivers, BLU-ETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1206 provide a low-level common infrastructure utilized by the applications 1210. The libraries 1206 can comprise system libraries 1230 (e.g., C standard library) that can provide functions such as memory allocation functions, string manipulation functions, mathematic functions, and the like. In addition, the libraries 1206 can comprise API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1206 can also comprise a wide variety of other libraries 1234 to provide many other APIs to the applications 1210.

The frameworks 1208 provide a high-level common infrastructure that can be utilized by the applications 1210. For example, the frameworks 1208 provide various graphical user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 comprise a home application 1250, a contacts application 1252, a browser application 1254, a book reader application 1256, a location application 1258, a media application 1260, a messaging application 1262, a game application 1264, and a broad assortment of other applications, such as a third-party application 1266. The applications 1210 can are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 1266 can invoke the API calls 1212 provided by the operating system 1204 to facilitate functionality described herein.

Figure 13:
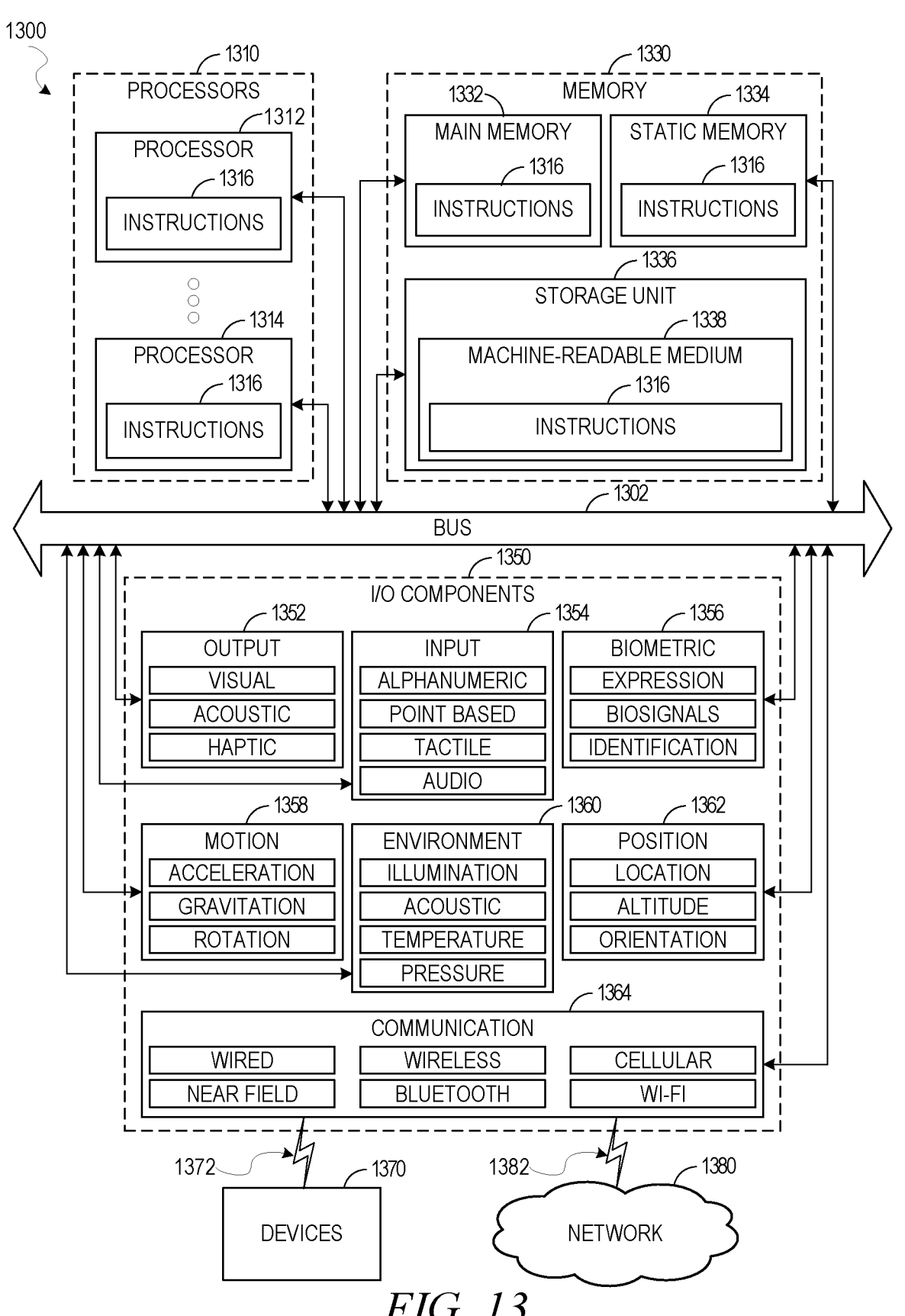
FIG. 13 illustrates a diagrammatic representation of a machine in the form of a computer system within which a set of instructions may be executed for causing the machine to perform any one or more of the methodologies discussed herein.

FIG. 13 illustrates a diagrammatic representation of a machine 1300 in the form of a computer system within which a set of instructions may be executed for causing the machine 1300 to perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the methods of FIG. 11.

Additionally, or alternatively, the instructions 1316 may implement FIGS. 1-11 and so forth. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to comprise a collection of machines 1300 that individually or jointly execute the instructions 1316 to perform any one or more of the methodologies discussed herein.

The machine 1300 may comprise processors 1310, memory 1330, and I/O components 1350, which may be configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may comprise, for example, a processor 1312 and a processor 1314 that may execute the instructions 1316. The term "processor" is intended to comprise multi-core processors that may comprise two or more independent processors (sometimes referred to as "cores") that may execute instructions 1316 contemporaneously. Although FIG. 13 shows multiple processors 1310, the machine 1300 may comprise a single processor 1312 with a single core, a single processor 1312 with multiple cores (e.g., a multi-core processor 1312), multiple processors 1312, 1314 with a single core, multiple processors 1312, 1314 with multiple cores, or any combination thereof.

The memory 1330 may comprise a main memory 1332, a static memory 1334, and a storage unit 1336, each accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 may comprise a wide variety of components to receive input, provide output, produce output, transmit information, exchange information, capture measurements, and so on. The specific I/O components 1350 that are comprised in a particular machine will depend on the type of machine. For example, portable machines such as mobile phones will likely comprise a touch input device or other such input mechanisms, while a headless server machine will likely not comprise such a touch input device. It will be appreciated that the I/O components 1350 may comprise many other components that are not shown in FIG. 13. The I/O components 1350 are grouped according to functionality merely for simplifying the following discussion, and the grouping is in no way limiting. In various example embodiments, the I/O components 1350 may comprise output components 1352 and input components 1354. The output components 1352 may comprise visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may comprise alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may comprise biometric components 1356, motion components 1358, environmental components 1360, or position components 1362, among a wide array of other components. For example, the biometric components 1356 may comprise components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may comprise acceleration sensor components (e.g., accelerometer), gravitation sensor components (e.g., accelerometer), gravitation sensor components, rotation sensor components (e.g., gyroscope), and so forth. The environmental components 1360 may comprise, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1362 may comprise location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may comprise communication components 1364 operable to couple the machine 1300 to a network 1380 or devices 1370 via a coupling 1382 and a coupling 1372, respectively. For example, the communication components 1364 may comprise a network interface component or another suitable device to interface with the network 1380. In further examples, the communication components 1364 may comprise wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., coupled via a USB).

Moreover, the communication components 1364 may detect identifiers or comprise components operable to detect identifiers. For example, the communication components 1364 may comprise radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

The various memories (i.e., 1330, 1332, 1334, and/or memory of the processor(s) 1310) and/or the storage unit 1336 may store one or more sets of instructions 1316 and data structures (e.g., software) embodying or utilized by any one or more of the methodologies or functions described herein. These instructions (e.g., the instructions 1316), when executed by the processor(s) 1310, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to comprise, but not be limited to, solid-state memories, and optical and magnetic media, including memory internal or external to processors. Specific examples of machine-storage media, computer-storage media, and/or device-storage media comprise non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may comprise a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component comprised in the communication components 1364) and utilizing any one of a number of well-known transfer protocols (e.g., Hypertext Transfer Protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to comprise any intangible medium that is capable of storing, encoding, or carrying the instructions 1316 for execution by the machine 1300, and comprise digital or analog communications signals or other intangible media to facilitate communication of such software. Hence, the terms "transmission medium" and "signal medium" shall be taken to comprise any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to comprise both machine-storage media and transmission media. Thus, the terms comprise both storage devices/media and carrier waves/modulated data signals.

What is claimed is:

1. A system comprising:

at least one hardware processor; and a non-transitory computer-readable medium storing instructions that, when executed by the at least one hardware processor, cause the at least one hardware processor to perform operations comprising:

accessing, via a plugin integrated with a software project management tool, a first document, the first document including a description of a capability need for a feature of a software in development;

accessing, from a software library in the software project management tool, a plurality of key performance indices (KPI) tests linked to the first document, each KPI test including at least one argument and at least one variable, each argument having an associated threshold;

detecting, via automatic monitoring of a status field of the first document within the software project management tool, that a status field of the first document has been changed to indicate that development of the feature has been completed;

in response to the detecting, automatically evaluating each of the plurality of KPI tests by programmatically retrieving data from a plurality of disparate systems and comparing the evaluated KPI tests to corresponding thresholds;

based on the evaluating, categorizing, by the plugin, a quality level of the feature in one of a plurality of different quality categories; and causing rendering of a user interface on a display, the user interface containing a screen corresponding to the first document and a visual indicator corresponding to the quality category in which the quality level of the feature has been categorized, wherein the user interface further comprises a selectable button that, when selected by a user, causes rendering of an indication of which of the plurality of KPI tests have passed and which have failed.

2. The system of claim 1, wherein the selectable button is rendered next to the visual indicator, and wherein the visual indicator is dynamically updated in real time based on results of the KPI tests.

3. The system of claim 2, wherein at least some of the plurality of KPI tests have been customized specifically for the first document.

4. The system of claim 1, wherein the user interface further includes a button rendered next to the visual indicator, the button, when selected by a user, causing rendering of a separate screen indicating which of the plurality of KPI tests have passed and which of the plurality of KPI tests have failed.

5. The system of claim 1, wherein at least one of the disparate systems is a bug and issue tracking component.

6. The system of claim 1, wherein at least one of the KPI tests is an indication of what percentage of source code corresponding to the feature is covered by at least one unit or integration test.

7. A method comprising:

accessing, via a plugin integrated with a software project management tool, a first document, the first document including a description of a capability need for a feature of a software in development;

accessing, from a software library in the software project management tool, a plurality of key performance indices (KPI) tests linked to the first document, each KPI test including at least one argument and at least one variable, each argument having an associated threshold;

detecting, via automatic monitoring of a status field of the first document within the software project management tool, that a status field of the first document has been changed to indicate that development of the feature has been completed;

in response to the detecting, automatically evaluating each of the plurality of KPI tests by programmatically retrieving data from a plurality of disparate systems and comparing the evaluated KPI tests to corresponding thresholds;

based on the evaluating, categorizing, by the plugin, a quality level of the feature in one of a plurality of different quality categories; and causing rendering of a user interface on a display, the user interface containing a screen corresponding to the first document and a visual indicator corresponding to the quality category in which the quality level of the feature has been categorized, wherein the user interface further comprises a selectable button that, when selected by a user, causes rendering of an indication of which of the plurality of KPI tests have passed and which have failed.

8. The method of claim 7, wherein the selectable button is rendered next to the visual indicator, and wherein the visual indicator is dynamically updated in real time based on results of the KPI tests.

9. The method of claim 8, wherein at least some of the plurality of KPI tests have been customized specifically for the first document.

10. The method of claim 7, wherein the user interface further includes a button rendered next to the visual indicator, the button, when selected by a user, causing rendering of a separate screen indicating which of the plurality of KPI tests have passed and which of the plurality of KPI tests have failed.

11. The method of claim 7, wherein at least one of the disparate systems is a bug and issue tracking component.

12. The method of claim 7, wherein at least one of the KPI tests is an indication of what percentage of source code corresponding to the feature is covered by at least one unit or integration test.

13. A non-transitory machine-readable medium storing instructions which, when executed by one or more processors, cause the one or more processors to perform operations comprising:

accessing, via a plugin integrated with a software project management tool, a first document, the first document including a description of a capability need for a feature of a software in development;

accessing, from a software library in the software project management tool, a plurality of key performance indices (KPI) tests linked to the first document, each KPI test including at least one argument and at least one variable, each argument having an associated threshold;

detecting, via automatic monitoring of a status field of the first document within the software project management tool, that a status field of the first document has been changed to indicate that development of the feature has been completed;

in response to the detecting, automatically evaluating each of the plurality of KPI tests by programmatically retrieving data from a plurality of disparate systems and comparing the evaluated KPI tests to corresponding thresholds;

based on the evaluating, categorizing, by the plugin, a quality level of the feature in one of a plurality of different quality categories; and causing rendering of a user interface on a display, the user interface containing a screen corresponding to the first document and a visual indicator corresponding to the quality category in which the quality level of the feature has been categorized, wherein the user interface further comprises a selectable button that, when selected by a user, causes rendering of an indication of which of the plurality of KPI tests have passed and which have failed.

14. The non-transitory machine-readable medium of claim 13, wherein the selectable button is rendered next to the visual indicator, and wherein the visual indicator is dynamically updated in real time based on results of the KPI tests.

15. The non-transitory machine-readable medium of claim 14, wherein at least some of the plurality of KPI tests have been customized specifically for the first document.

16. The non-transitory machine-readable medium of claim 13, wherein the user interface further includes a button rendered next to the visual indicator, the button, when selected by a user, causing rendering of a separate screen indicating which of the plurality of KPI tests have passed and which of the plurality of KPI tests have failed.

17. The non-transitory machine-readable medium of claim 13, wherein at least one of the disparate systems is a bug and issue tracking component.

* * * * *